United States Patent
Brodsky et al.

(10) Patent No.: US 12,165,269 B2
(45) Date of Patent: Dec. 10, 2024

(54) CLOUD-BASED GARMENT DESIGN SYSTEM

(71) Applicants: Yuliya Brodsky, San Mateo, CA (US); Donald E Straub, San Mateo, CA (US); Evgeni Zapadisnky, Moscow (RU); Dmitry Popov, Moscow (RU); Konstantin Rudnechenko, Moscow (RU)

(72) Inventors: Yuliya Brodsky, San Mateo, CA (US); Donald E Straub, San Mateo, CA (US); Evgeni Zapadisnky, Moscow (RU); Dmitry Popov, Moscow (RU); Konstantin Rudnechenko, Moscow (RU)

( * ) Notice: Subject to any disclaimer, the term of this patent is extended or adjusted under 35 U.S.C. 154(b) by 0 days.

(21) Appl. No.: 16/118,913

(22) Filed: Aug. 31, 2018

(65) Prior Publication Data
US 2019/0272679 A1   Sep. 5, 2019

Related U.S. Application Data

(60) Provisional application No. 62/637,097, filed on Mar. 1, 2018.

(51) Int. Cl.
*G06T 19/20* (2011.01)
*G06F 30/20* (2020.01)
(Continued)

(52) U.S. Cl.
CPC .............. *G06T 19/20* (2013.01); *G06F 30/20* (2020.01); *G06Q 30/0621* (2013.01);
(Continued)

(58) Field of Classification Search
CPC .............. G06F 17/5009; G06F 2217/12; G06F 2217/32; G06Q 30/0621; G06Q 30/0643; G06T 19/20
See application file for complete search history.

(56) References Cited

U.S. PATENT DOCUMENTS

| | | | |
|---|---|---|---|
| 6,564,118 B1 * | 5/2003 | Swab | G06Q 30/02 700/130 |
| 6,907,310 B2 * | 6/2005 | Gardner | A41H 1/00 700/132 |

(Continued)

OTHER PUBLICATIONS

Youtube video, "CLO Live Demo", streamed live on Mar. 2, 2016. https://www.youtube.com/watch?v=DmkSd_eQuo8 (Year: 2016).*

*Primary Examiner* — Sing-Wai Wu
(74) *Attorney, Agent, or Firm* — Richard Eldredge; Leavitt Eldredge Law Firm

(57) ABSTRACT

Cloud-based garment design system is disclosed. The cloud-based multiuser garment design system provides automated interactive 3D fashion design, product visualization, made-to-measure pattern drafting and commercialization as a one-step process. The system solves a problem of numerous, laborious and complex steps for manual or computerized fashion design and illustration, pattern drafting that fit different body shapes, heights and sizes, and a resulting 3D product simulation and visualization regardless of design complexity and size or shape of the user. The system provides complex customization of design of fashion and accessories, using individual parametric patterns, which result in realistic final garment preview on a personalized 3D mannequin, by assigning pattern elements to the unique design, using a scripted programming language. The system implements different levels of interaction, allowing usage of created patterns as redistributed design elements inside the system thus provides the basis for internal commercialization of user's work along with the external commercialization of the final design.

8 Claims, 15 Drawing Sheets

(51) Int. Cl.
  *G06Q 30/0601* (2023.01)
  *G06F 113/12* (2020.01)
  *G06F 119/18* (2020.01)

(52) U.S. Cl.
  CPC ...... *G06Q 30/0643* (2013.01); *G06F 2113/12* (2020.01); *G06F 2119/18* (2020.01)

(56) References Cited

U.S. PATENT DOCUMENTS

| | | | |
|---|---|---|---|
| 2006/0278150 A1* | 12/2006 | Roos | A41H 3/00 |
| | | | 112/475.19 |
| 2010/0030578 A1* | 2/2010 | Siddique | G06Q 30/06 |
| | | | 705/3 |
| 2016/0271882 A1* | 9/2016 | Tatourian | G05B 19/4099 |
| 2016/0292779 A1* | 10/2016 | Rose | G06F 3/017 |
| 2017/0004567 A1* | 1/2017 | Dutt | G06Q 30/0643 |
| 2018/0020756 A1* | 1/2018 | Nouais | G06T 17/20 |
| | | | 700/135 |
| 2018/0077987 A1* | 3/2018 | Ko | A41H 3/007 |
| 2019/0343206 A1* | 11/2019 | Krishnan | G06Q 50/04 |

\* cited by examiner

FIG. 5 Data Access Diagram

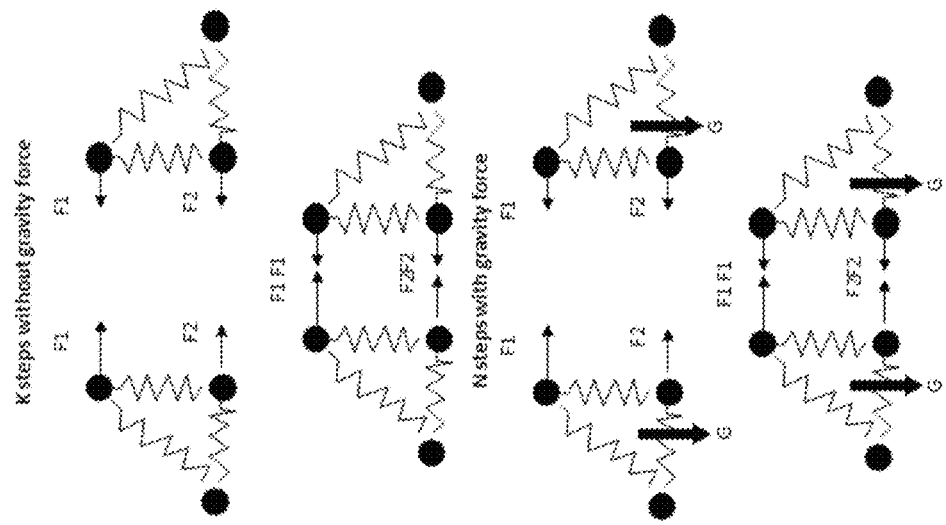
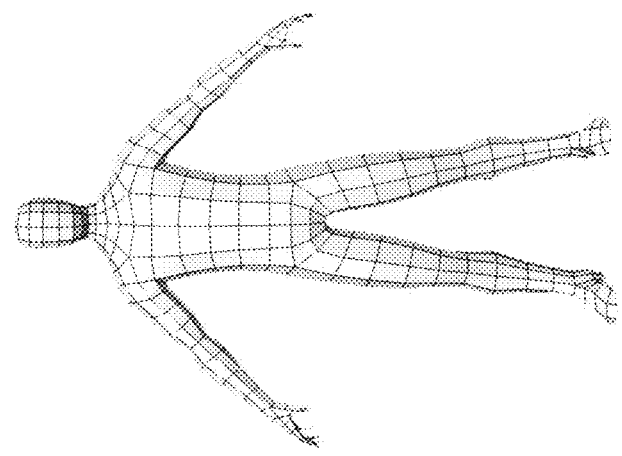
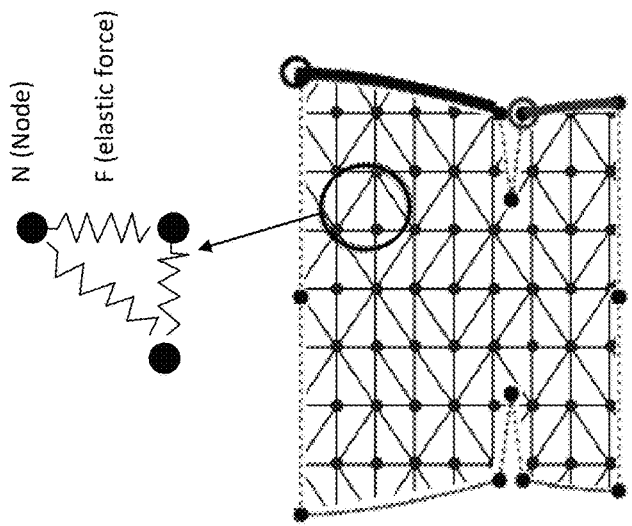
FIGURE 8

CLOUD-BASED GARMENT DESIGN SYSTEM

BACKGROUND

1. Field of the Invention

The invention pertains generally to the field of computer-implemented systems and methods, and more particularly for garment and fashion accessories design, or any other fashion article of any complexity.

2. Description of Related Art

Today there are numerous computer-implemented design systems that provide software tools for automated garment design. However, such automated tools are conventionally limited due to time-consuming approaches to realistic design of the garment.

For example US Patent US20110218664A1 titled Fashion Design Method, System and Apparatus teaches creation of personalized 3D virtual avatars, converting their data into 2D drawings or transfers the data to a machine, building a 3D physical model, which can then be used for fit and esthetic analysis. It teaches that using a push and pull technique to create a personalized 3D virtual model from a library model, which can then be used for an analysis of how clothing will look on a particular person. The use of push and pull technique personalizes a 2D design templates and/or drawings, which may be preloaded into the computer library or added by the user by drawing them directly on the computer using a CAD software for example, or added by other ways as for example drawing on paper and scanning the drawing into the computer.

U.S. Pat. No. 6,907,310B2 discloses production and visualization of garments using methods and systems for modeling and modifying garments, providing a basis for integrated "virtual tailoring" systems and processes. The garment models provided relate specific design points of the garment to specific body regions in terms of explicit 3D relationship rules, enabling garments to be modified holistically, by a constrained 3D warp process, to fit different body shapes/sizes, either in order to generate a range of graded sizes or made-to-measure garments, for the purposes of visualization and/or garment production. The methods described further facilitate the generation of 2D pattern pieces by flattening 3D representations of modified garments using a constrained internal energy minimization process, in a manner that ensures that the resulting pattern pieces can be assembled in substantially the same way as those of the base garment. The methods enable the visualization and/or production of bespoke or graded garments, and garment design modifications, within an integrated virtual tailoring environment.

Patent No CN1779687A teaches facilitating pattern-based clothing design activities, usable by a processor to enable a user to select a type of garment and view an image of the pattern for the garment. Under direction of the system, the processor enables the user to input data relating to the characteristics of an intended wearer of the garment. The processor generates knitting instructions, indications of varying degrees of pressure applied by garments to a graphical model, and printings of pattern representations of pattern providers.

Patent US20150154691A1 entitled System and Method For Online Virtual Fitting Room discloses a system and method for virtually fitting an article of clothing on a virtual 3D avatar, obtained by scanning of the user in minimal clothing. A graphical user interface allows the user to access a database of garments and accessories available for selection for the virtual fitting simulation for which each garment's physical and material properties are known. A finite element analysis is applied that determines the shape of the combined user body and garment and an accurate visual representation of the selected garment or accessory on the proportional model of the user's body based on the analysis is generated. Means are also provided for the user to solicit custom garments or accessories from a participating designer or retailer, purchase selected garments or accessories from the participating designer or retailer, and communicate his or her preferences with participating designers, retailers, or other users.

US patent application 2011/0218664 entitled Fashion Design Method, System and Apparatus describes methods, systems and apparatuses that can be used for clothes and fashion design. It claims multi-step interactive process based on personalized biometric data, involving user to control overall process and to perform numerous actions to achieve desirable result.

Patent US20130083065A1 entitled Fit prediction on three-dimensional virtual model teaching the systems and methods for conducting and providing a virtual shopping experiences, which enable a customer to create a customer-specific dimension data and then securely utilize their dimension data to conduct virtual shopping sessions with a plurality of different and unrelated entities.

Patent US20140035913A1 disclosing a virtual dressing room method and system to facilitate recognition of gestures representing commands to initiate actions within an electronic marketplace on behalf of a user. For that spatial data about an environment external to a depth sensor may be received by an action machine. The action machine may generate a first model of a body of the user based on a first set of spatial data received at a first time. The action machine may then generate a second model of the body of the user based on a second set of spatial data received at a second time. The action machine may further determine that a detected difference between the first and second models corresponds to a gesture by the user, and that this gesture represents a command by the user to initiate an action within the electronic marketplace on behalf of the user.

US patent application 2018/0077987 entitled Method for Designing Garments Using Garment Graph Programming describes a method for define a dress using concepts of programming language. The method comprises steps for providing a database or an asset for a garment, providing at least one prototype garment for the garment including principal panels, uploading the prototype garment on a graph window by selecting and associating a principal panel from the asset for each part of the garment, selecting from corresponding assets and adding one or more non-principal panels to the principal panels, programming the garment graph by associating one or more predetermined operations to be applied to each of the principal panels based on a fitting-target body, compiling the programmed garment graph and constructing the garment, and displaying the constructed garment as fitted a mannequin in a garment window. The system employs the 3D data to carry out a number of functions including the automatic generation of 3D garment patterns, the accurate prediction of sizes, and the virtual trying on of garments.

None of the above inventions, however, provide a single environment where the cloud-based system will automatically deliver all of the essential components of complete fashion design, regardless of complexity of the design and product development process within seconds, generated by users with a single click, including but not limited to the following: 2D technical sketch, customized made-to-measure flat pattern resultant from generative design parametric and anthropometric algorithms, an automatic 3D visual simulation of the design fitting the 3D personalized avatar, as well as production-ready technical package, cutting marker layout, construction instructions and pattern specification measurements.

BRIEF SUMMARY OF THE INVENTION

The present invention provides methods, systems and apparatuses to solve a problem of laborious manual or computerized creative fashion conceptualizing, customizing fit and design of pattern drafting and 3D garment simulation regardless of design complexity, providing personalization of design of products, individual bespoke fitting and final garment preview on a figure by producing a cloud based integrated environment suitable for mass production, custom and made-to-measure apparel design.

Generally, it is contemplated herein that novel multiuser garment design apparatus and/or computer-implemented process enables network-accessible automated interactive 3D fashion design, product visualization, made-to-measure pattern drafting and commercialization as a one-step process.

In one embodiment, a network-accessible processor provides tools to create, edit, compile, label, reuse of garment design elements in the form of parametric pattern algorithms, representing pattern geometry via relations between its elements, constraints and set of parameters which then are stored in the Library (database).

Also, a network-accessible processor provides tools to select design elements from the Library (database) to combine them into the garment representation by applying to parametrical patterns algorithms user-defined measurements, automatically sew patterns together while applying physics modeling of predefined material properties e.g. textile density, resilience, color etc.

Furthermore, such processor provides virtual-reality 3D representation of the designed garment as mannequin dressed in it for visual review of the design, for interactive editing of the parametrical patterns to alter garment fit and representation, to change garment elements, color, textile properties, for final check of the design. The result is a personalized made-to-measure garment which is exported by processor in the form of a flat technical sketch of patterns, CAD, CAM or other computer-readable file suitable for immediate production. Alternatively, the result can be a set of graded garments, produced by applying a preset in the form of a size grid, thus processor exports a set of flat technical sketches of patterns, CAD, CAM or other computer-readable files for mass production.

Optionally processor provides means of commercial distribution of the final product, pattern or a user-created kit by itself or via integration with the 3rd party solutions.

Traditional apparel design and development is a time consuming complex process, which usually takes 2-4 months to accomplish. It is typically performed by a large number of highly skilled professionals. Multiple complex steps are involved in this process starting from the initial stage when a fashion designer creates an inspirational mood board, line art technical sketches that represent flat images of the intended designs, Design Specification sheet, describing all of the components of this specific design. At the second step patternmaker interprets the design and creates a structural design method of this style, adjusting a resulting pattern to work for specific fabric properties. The next step is cutting and preparing the pattern for the sample making process, which is performed by a seamstress, which cuts pattern pieces out of the fabric and sewing then. During this process, the designer and a team of merchandisers evaluate the design for both the aesthetic and commercial value and for fit. Almost always the first sewn sample will contain a number of corrections and design changes. It is often takes 2-4-time process repeat to finally arrive at a garment that is ready to go into production.

Additionally, apparel can also be custom designed and made-to-measure or tailored by either a commercial dressmaker or by do-it-yourself seamstress at home. Custom tailoring usually begins by helping a customer choose design by either illustrating a design idea or showing an already made design as an inspiration, then measuring a customer, selecting fabric and deciding on fit preferences. Then the design idea needs to be translated into a drafted flat pattern to fit the customer's measurements. Then cutting and sewing the garment as described above. Then correcting the garment's fit during the one or more fittings. The final garment is custom-made to the customer's unique preferences and body shape. However, custom tailoring is usually very expensive due to the complexity of the process and great amount of manual labor involved in preparation each custom garment and also the large number of fittings involved.

Computer-implemented design systems provide software tools for automated garment design. However, such automated tools are conventionally limited due to time-consuming approaches to realistic design of the garment.

Tools and skills of people, involved in the garment designs are highly fragmented, thus enforcing the need of creating customized solutions to integrate their actions and results of work into common workflow.

DESCRIPTION OF THE DRAWINGS

The novel features believed characteristic of the embodiments of the present

FIG. 2

FIG. 2

FIG. 8 illustrates representative apparatus and method embodiment diagram particularly work flow physic modeling for cloud-based multiuser garment design according to one or more aspect of the present invention.

DETAILED DESCRIPTION OF THE PREFERRED EMBODIMENT

The embodiments of the invention are described in detail in reference to the figures.

The present invention provides methods, systems and apparatuses for computerized fashion design and automated pattern drafting. More particularly, the present invention solves a problem of laborious manual or computerized creative fashion conceptualizing, pattern drafting and 3D garment simulation regardless of design complexity or user's skill level, providing custom design of products, individual customized virtual fitting and final garment preview on a figure by producing a cloud based integrated environment within a single working space, such as computer or any mobile device screen.

Furthermore, another goal of this invention is to provide a single-step automation infrastructure for apparel manufacturing of made-to-measure and custom designed garments, as well as mass produced apparel, utilizing currently adopted manufacturing methods and in addition enabling one-step digital printing and automated cutting, 3D seamless knitting, 3D garment printing and Direct Pattern On Loom machines.

Figure 1:
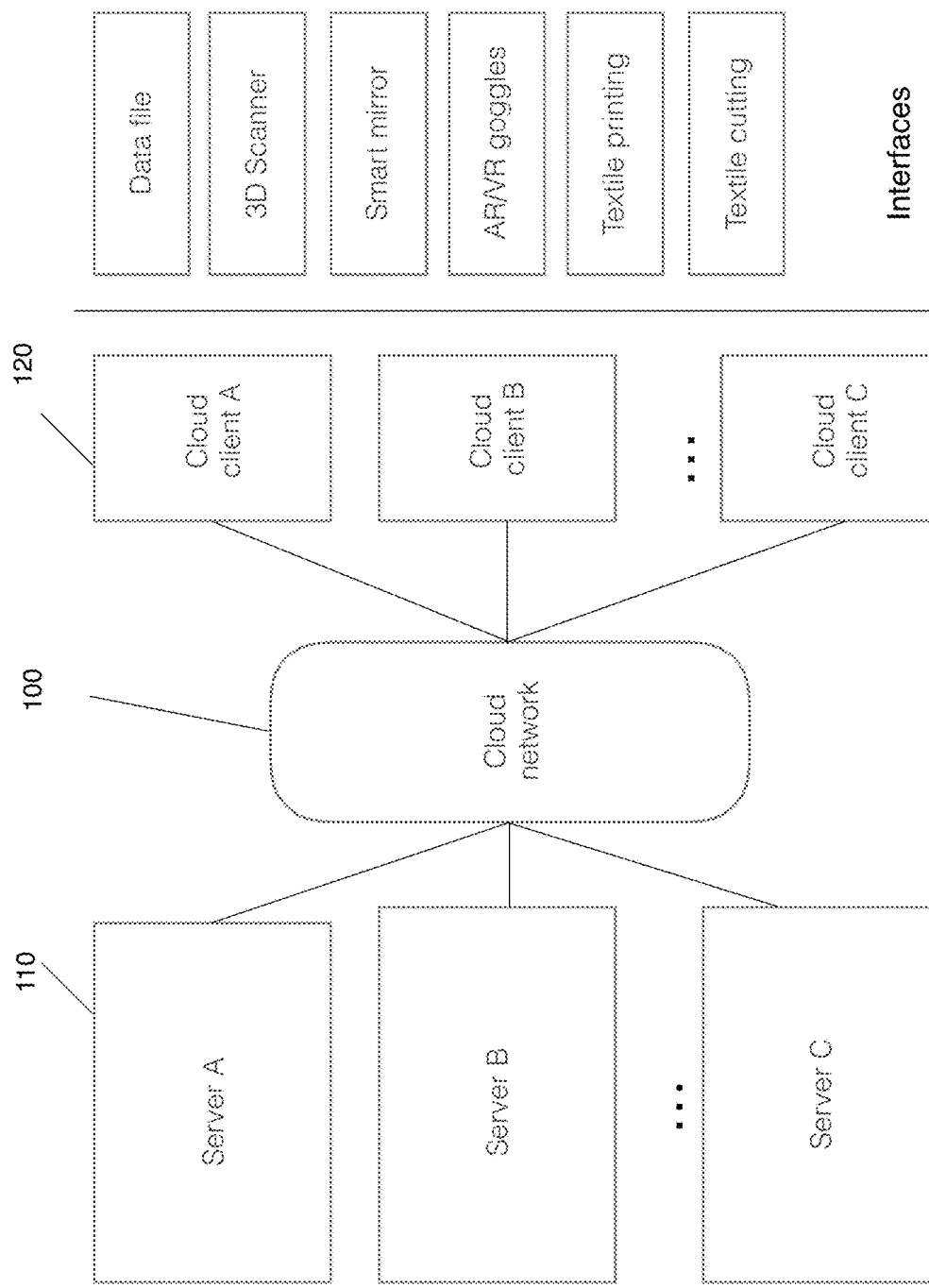
FIG. 1 illustrates representative apparatus embodiment diagram for cloud-based multiuser garment design according to one or more aspect of the present invention.

FIG. 1 illustrates representative apparatus embodiment diagram for cloud-based multiuser garment design according to one or more aspect of the present invention. It is contemplated herein that one or more inventive aspects may be embodied in one or more computing or communication device, network server and/or client device, peer, controller node, or other functionally equivalent electronic signal processing machine, firmware, and/or software accessible via one or more wired and/or wireless network. For example, as shown system servers 110 A/B/C couple via cloud network 100 to various clients 120 A/B/C having processor, storage, interface, and various data input/output (data file, 3D scan, Smart mirror, AR/VR goggles, textile printing and cutting machines, etc) to provide network-accessible garment design.

Figure 2:
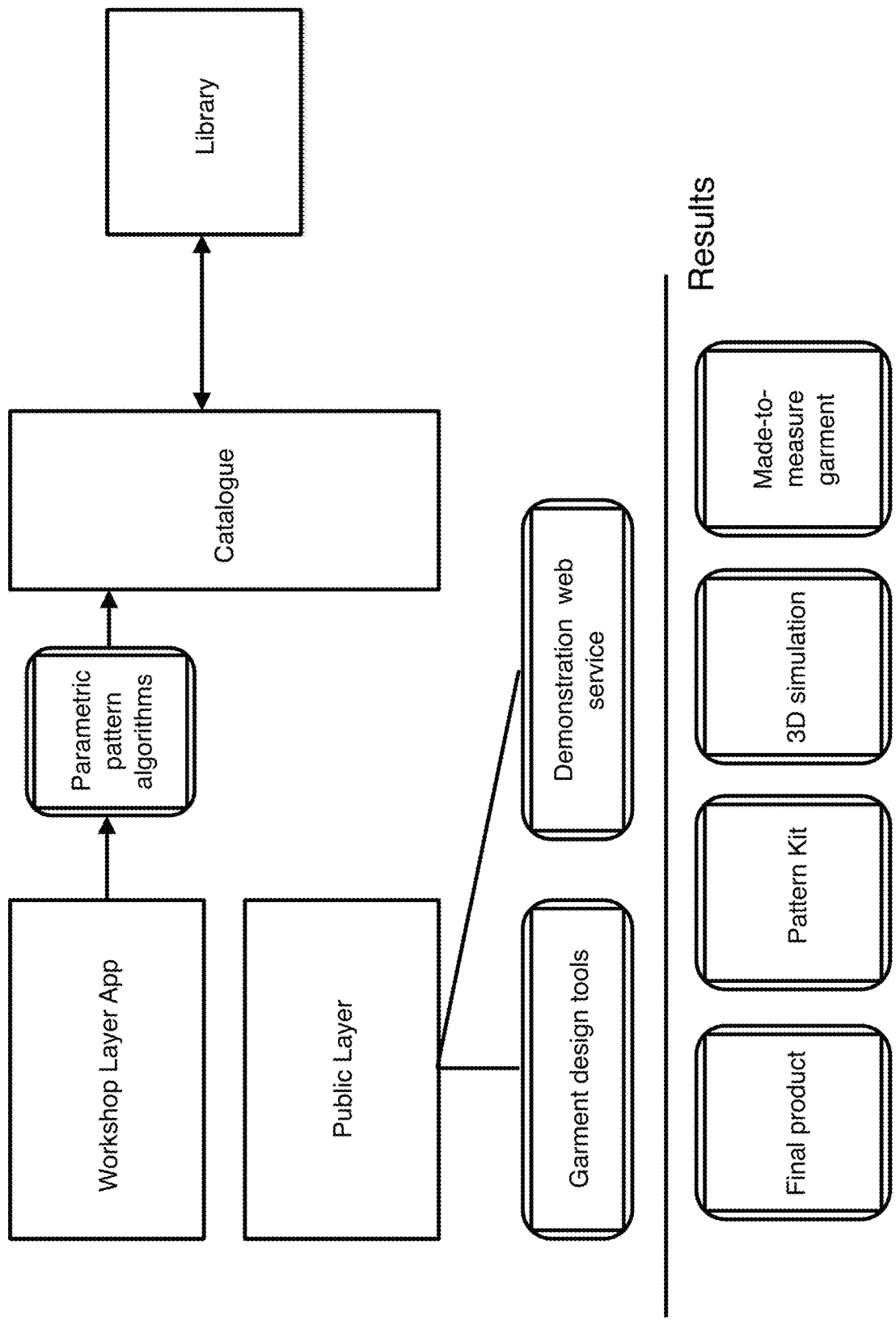
FIG. 2 illustrates functional structure of the system.

It is contemplated herein that one or more inventive aspects may be embodied in computer-implemented steps automated to operate on various processing machines using one or more software programs, firmware, as well as signal processing circuitry or other electronically programmable hardware preferably accessible via one or more wired and/or wireless network. FIG. 2 illustrates functional structure of the system. For example, it can be represented by distributed client-server system, where clients consisting of the following: Workshop layer is a web application for pattern makers, it provides environment to create parametric pattern algorithms serves as an design elements for further garment design. Public layer is a web application to create a final product, pattern kit, 3D simulation and personalized made-to-measure garment. It includes tools for garment design, web service demonstration of a finished sewn product, fitting on a 3D representation of person's figure (3D mannequin). Catalog—a web service for accessing the system Library.

Figure 3:
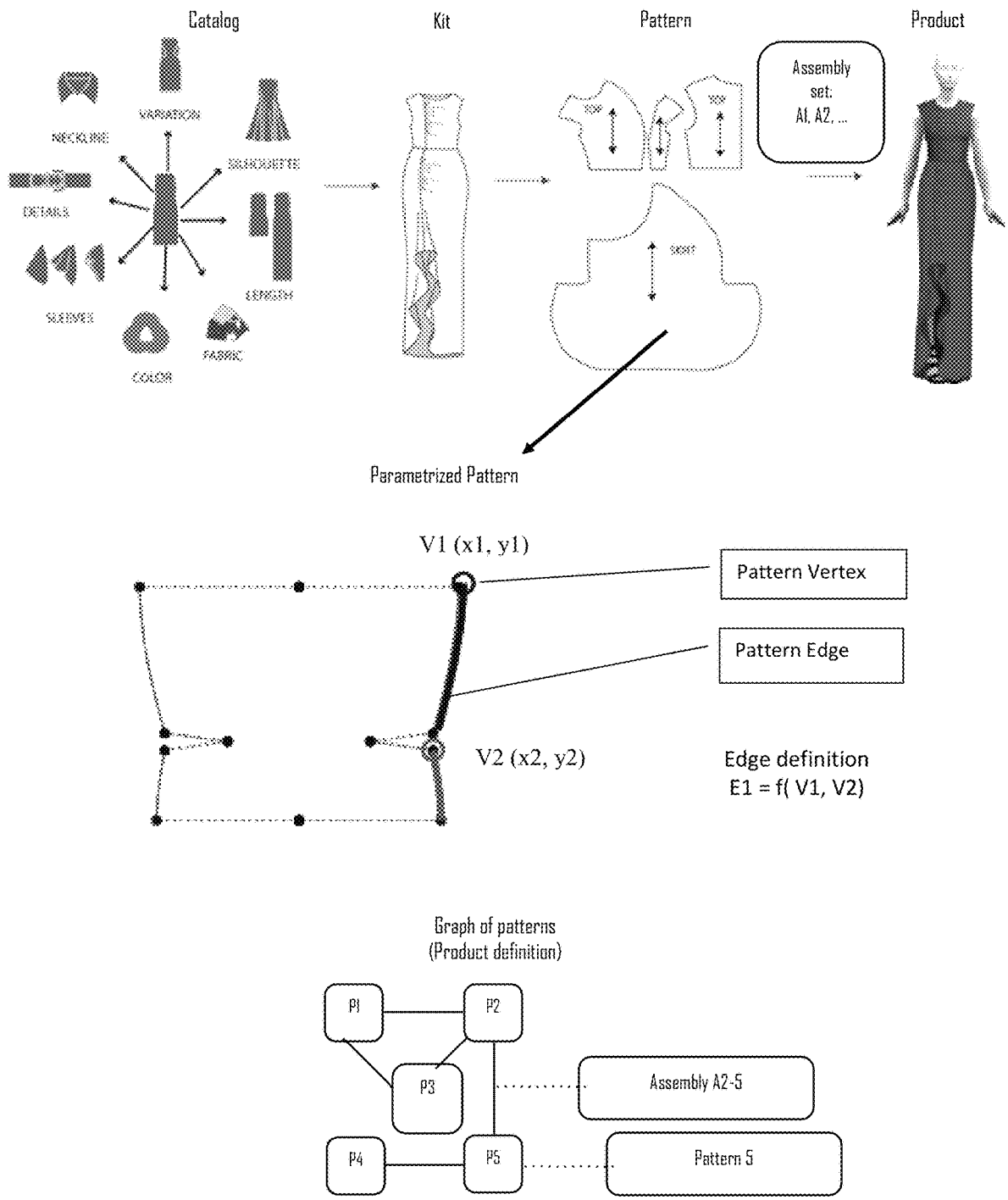
FIG. 3-4 illustrate representative apparatus embodiment diagram for cloud-based multiuser garment design particularly data structure and set of objects according to one or more aspect of the present invention.

FIG. 3 illustrates representative apparatus embodiment diagram particularly data structure and set of objects for cloud-based multiuser garment design according to one or more aspect of the present invention. Pattern element is a representation of garment's pattern in the system. Parameterized Pattern—is an algorithmic definition of Pattern element's geometry. Kit—a file containing one or more patterns. Product—a finished piece of clothing sewn in 3D from several pattern elements. Assembly—a seam (stitching) of several pattern elements. Graph of patterns—a set of pairs "vertices" and "edges"; Vertices—patterns, edges—assemblies.

Figure 4:
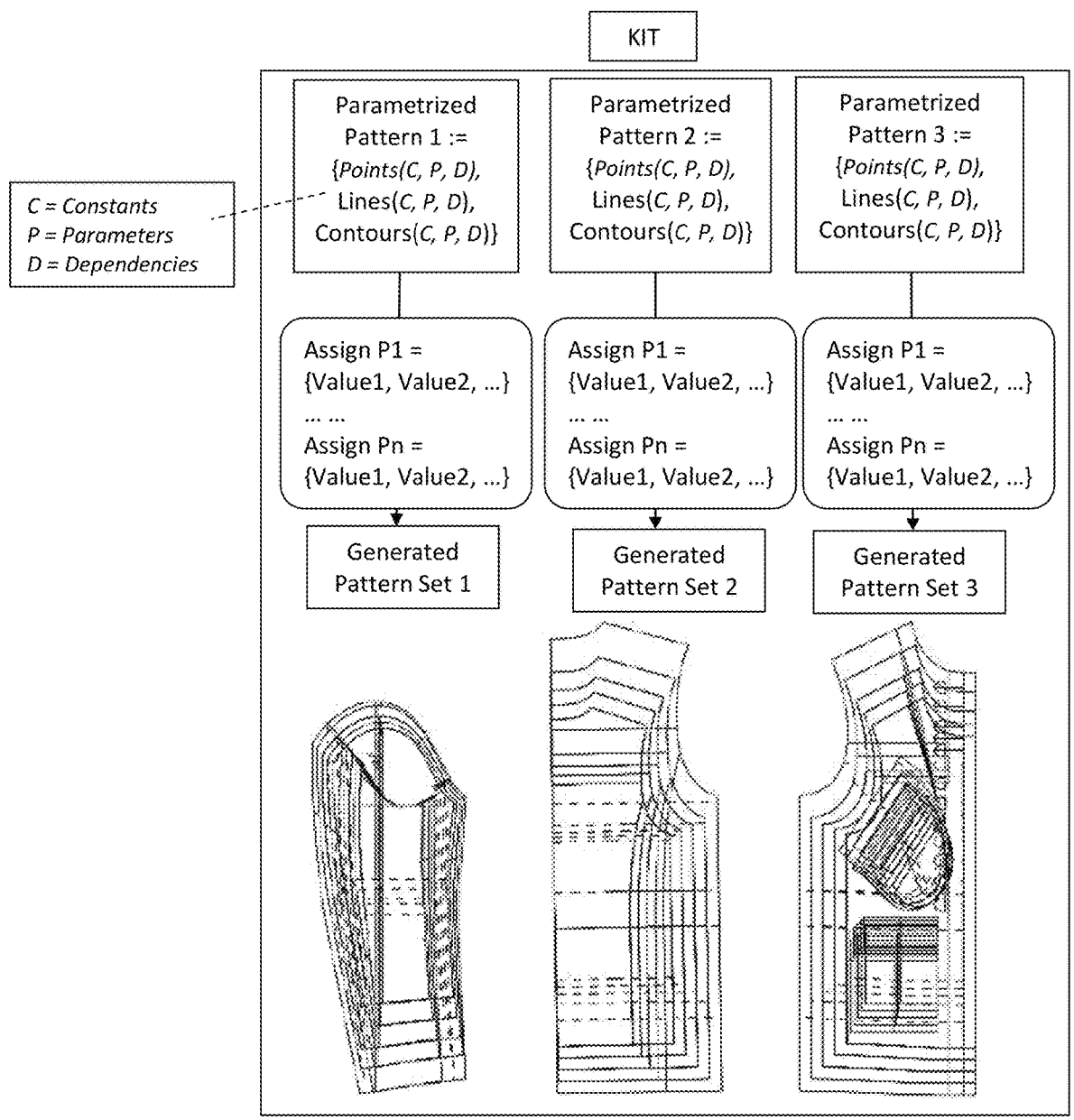

FIG. 4 illustrates representative apparatus embodiment diagram particularly data structure and set of objects for cloud-based multiuser garment design according to one or more aspect of the present invention. Operators and commands in a kit describe contours and lines of patterns, being parameterized variables and functional dependencies between them. Variables, whose values are not specified directly in the text, define the so-called "parameterization" of the kit. Thus, by setting the parameterization and interpreting the code of the kit, a set of patterns are obtained.

Figure 5:
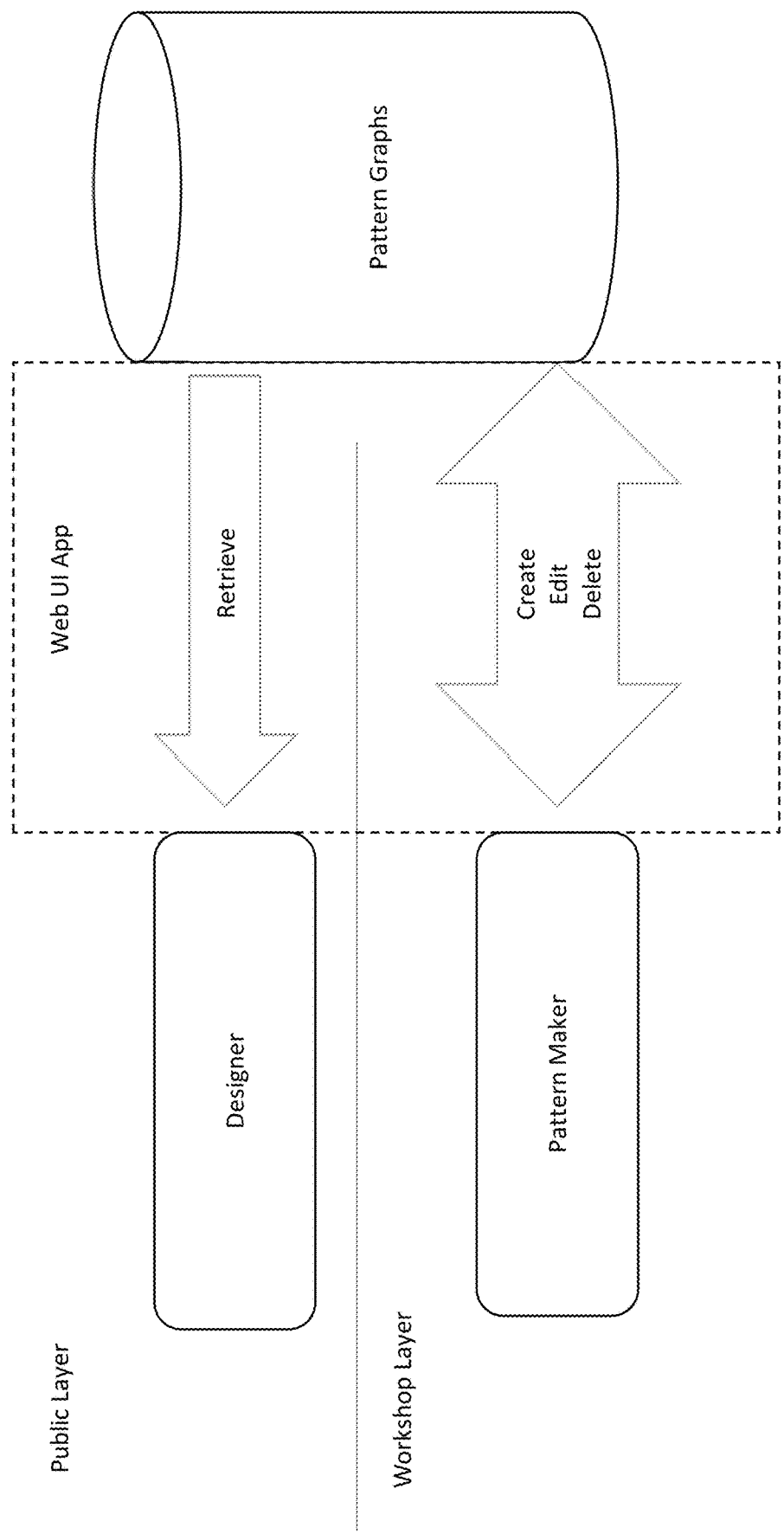
FIG. 5 illustrates representative apparatus embodiment diagram particularly data access diagram for cloud-based multiuser garment design according to one or more aspect of the present invention.

FIG. 5 illustrates representative apparatus embodiment diagram particularly data access diagram for cloud-based multiuser garment design according to one or more aspect of the present invention. Workshop layer and Public layer applications use a common Library (database) to store the graph of the patterns and the intermediate results of pattern makers' work. The Library (database) provides different access levels for them. For Workshop layer, it provides full access for creation, editing, deleting of parametric patterns and kits, thus supporting work of pattern makers on the graph of patterns. For Public layer, it provides read access on request, retrieves information about the available patterns from the catalog and presents them via the web interface.

Multi-level access to exposed functionality of interactive 3D fashion design reflects users' role in the system. They divided onto: Pattern Maker—the person drafting or coding algorithms of various interchangeable pattern elements and identifying areas where they are stitched together. Designer—front-end user who selects various available pattern elements to create a final product, pattern kit, 3D simulation and personalized made-to-measure garment.

Figure 6:
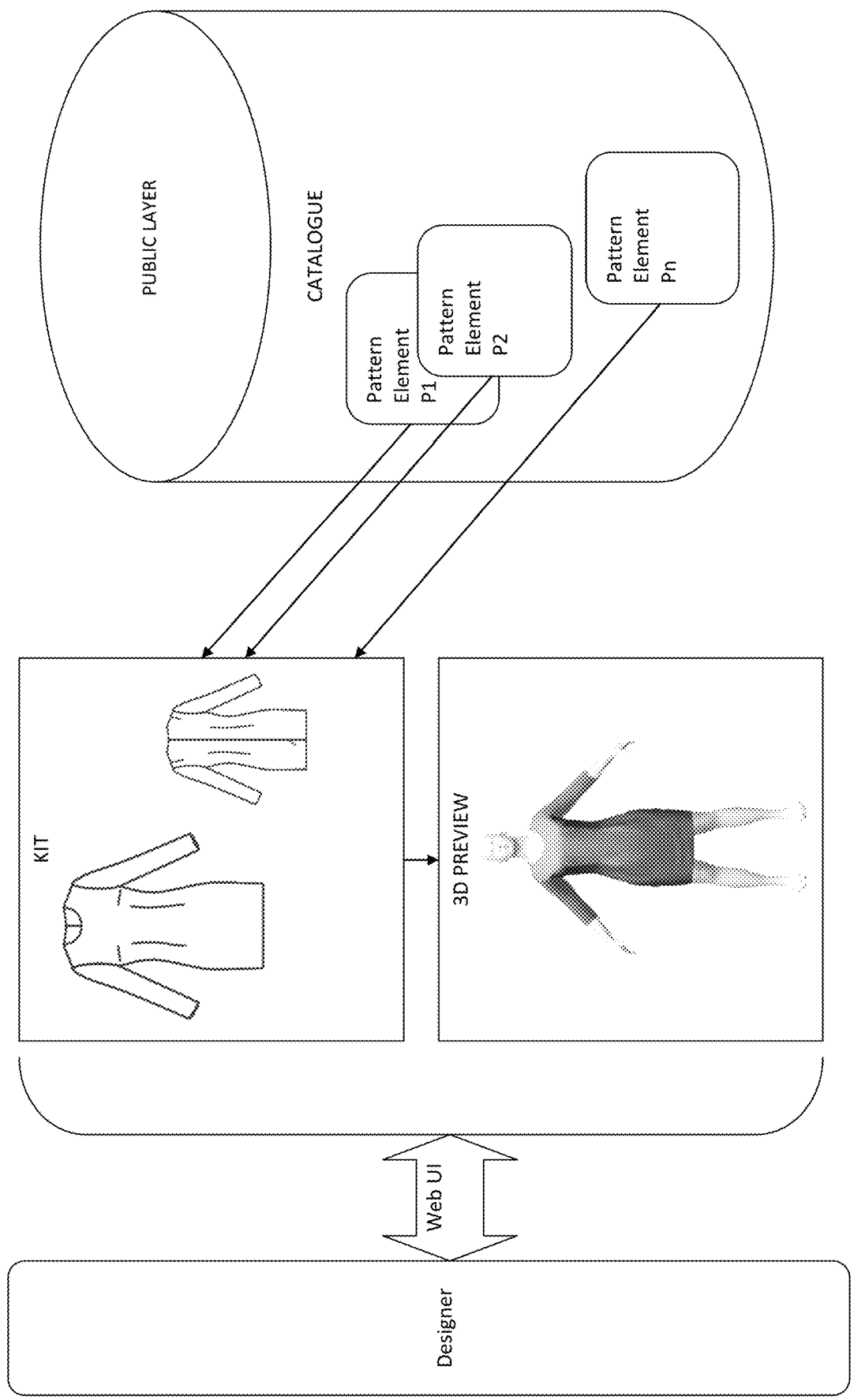
FIG. 6 illustrates representative apparatus and method embodiment diagram particularly work flow interactive design for cloud-based multiuser garment design according to one or more aspect of the present invention.

FIG. 6 illustrates representative apparatus and method embodiment diagram particularly work flow interactive design for cloud-based multiuser garment design according to one or more aspect of the present invention. As shown work flow design includes various manual and/or automated operational steps. Through the web interface foregoing defined Designer selects various garment design elements into kits, thus individually stylizing a product design and resulting patterns even of the most challenging complexities. While configuring of a product by selecting garment elements from the Catalogue necessary for a new design, a customer gets access to the 3D realistic preview.

Figure 7:
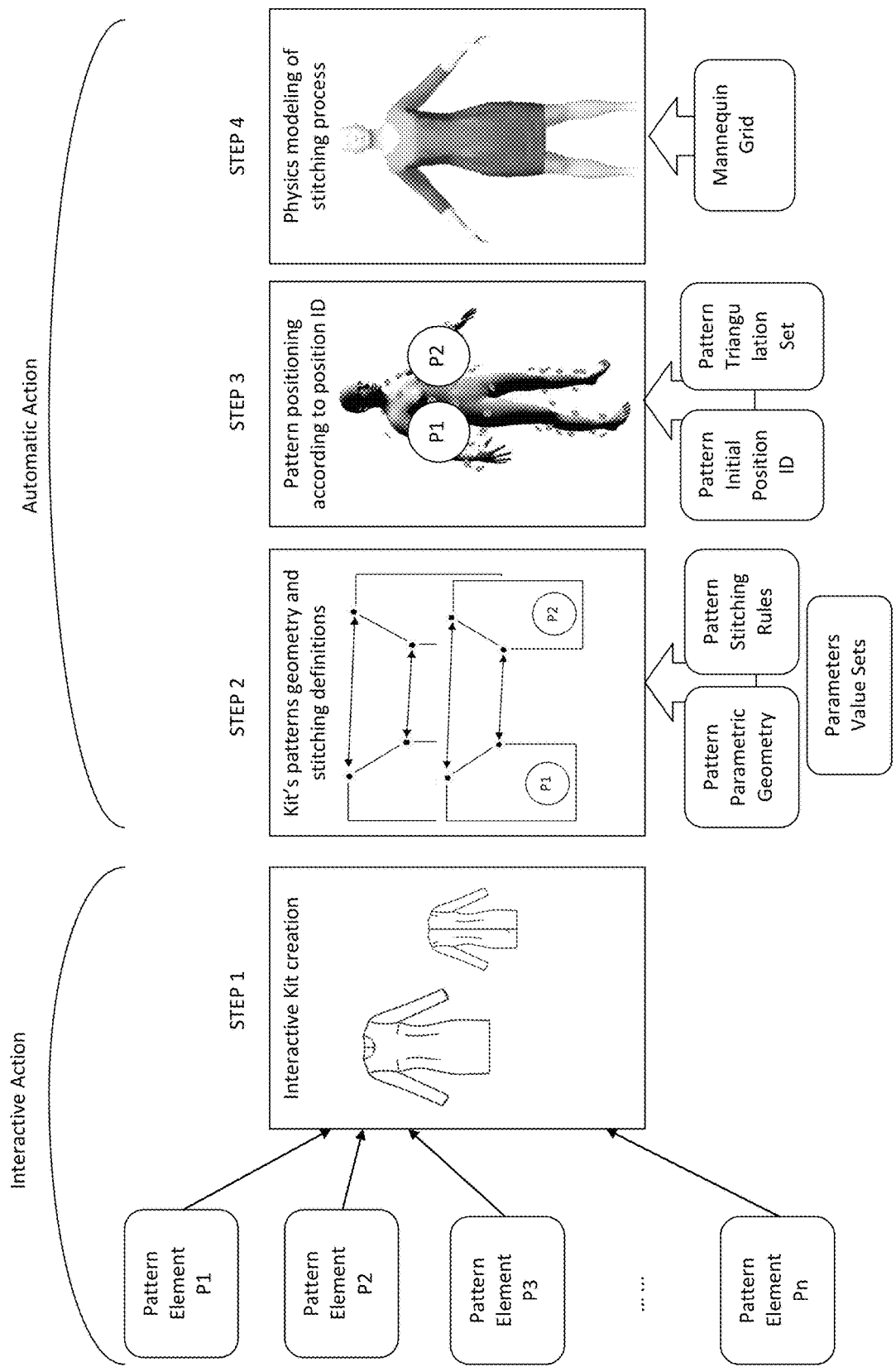
FIG. 7 illustrates representative apparatus and method embodiment diagram particularly work flow stitching calculation for cloud-based multiuser garment design according to one or more aspect of the present invention.

FIG. 7 illustrates representative apparatus and method embodiment diagram particularly work flow stitching calculation for cloud-based multiuser garment design according to one or more aspect of the present invention. As shown work flow design includes various manual and/or automated operational steps. Simulation of the physics of the stitching is automatically performed in the cloud server. The request to start simulation is initiated, containing a list of garment elements patterns for stitching and parameterization for the kits in which they are placed. Next, the server builds the geometry of the patterns in the plane, executing the code of the corresponding kits by means of assigning the variables without initial values provided by the parameterizations. The next step is to extract from the Library records of the assembly of individual sections of contours and lines of patterns. Triangulation of patterns and their placement in three-dimensional space is carried out in accordance with the given initial positions, extracted from the Library. After the described actions, the three-dimensional triangles are sculpted. In addition, the mannequin grid, constructed according to the anthropometric features specified in the parameterizations, is fed to the input of the physical solver.

FIG. 8 illustrates representative apparatus and method embodiment diagram particularly work flow physical modeling for cloud-based multiuser garment design according to one or more aspect of the present invention. The main function of the apparatus is to calculate the positions of objects, triangles in our case, through a given (small) time interval. Simulation of the stitching using this interface is realized as follows:
1) Simulation objects—triangles of patterns.
2) Restrictions (the bodies inside which the objects should not penetrate)—the mannequin grid.
3) Simulation step:
   a) The first N steps—the force of gravity is turned off, step-by-step approach of the edges at the seams.
   b) Subsequent K steps are a conventional simulation with gravity included.

Numbers N and K are selected depending on the parameters of the mannequin and the patterns of the product.

Simulation calculations to achieve interactivity are performed using a dedicated graphics accelerator located on a remote server. After the simulation is complete, the calculated positions of the triangles of the patterns are transferred to the client software for further visualization.

Figure 9:
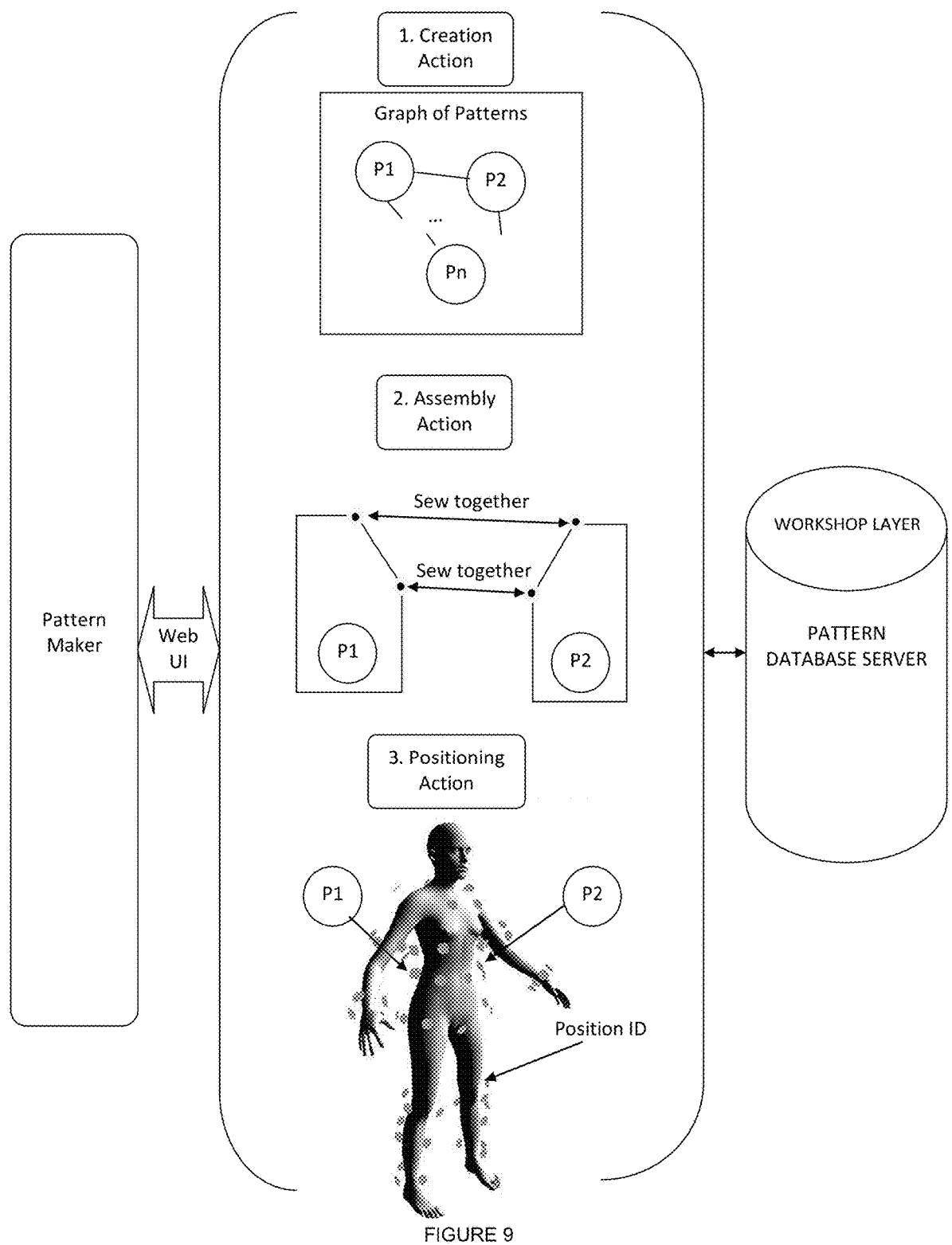
FIG. 9 illustrates representative apparatus and method embodiment diagram particularly work flow interactive pattern definition for cloud-based multiuser garment design according to one or more aspect of the present invention.

FIG. 9 illustrates representative apparatus and method embodiment diagram particularly work flow interactive pattern definition for cloud-based multiuser garment design according to one or more aspect of the present invention. As shown work flow design includes various manual and/or automated operational steps. Graph of the patterns is created by pattern maker using the web interface of the Work Layer. The patterns from the kits loaded on its server are available for two actions. The first, the assembly, is the definition of parts of the contours that are needed to be sewn together the second is the assignment of the initial positions of the pattern on the mannequin before the start of simulation of the physics of the tissue. This assignment is done relatively. It means, the patterns are not attached to specific 3D coordinates of points on the mannequin, but to points' identifiers. This indirect definition allows obtaining three-dimensional binding coordinates of patterns for mannequins, based on various anthropometric features.

All auxiliary actions (authentication, authorization, placement of patterns on the desktop, preview of the initial layout of the mannequins, preview of the results of the fabric simulation) pattern makers perform through the graphical interface of the web application on the Internet browser. In this case, all changes made to the graph of the patterns (creation of new assemblies, addition of new patterns and their placement on the mannequin) are saved in the working layer of the database on the server.

Figure 10:
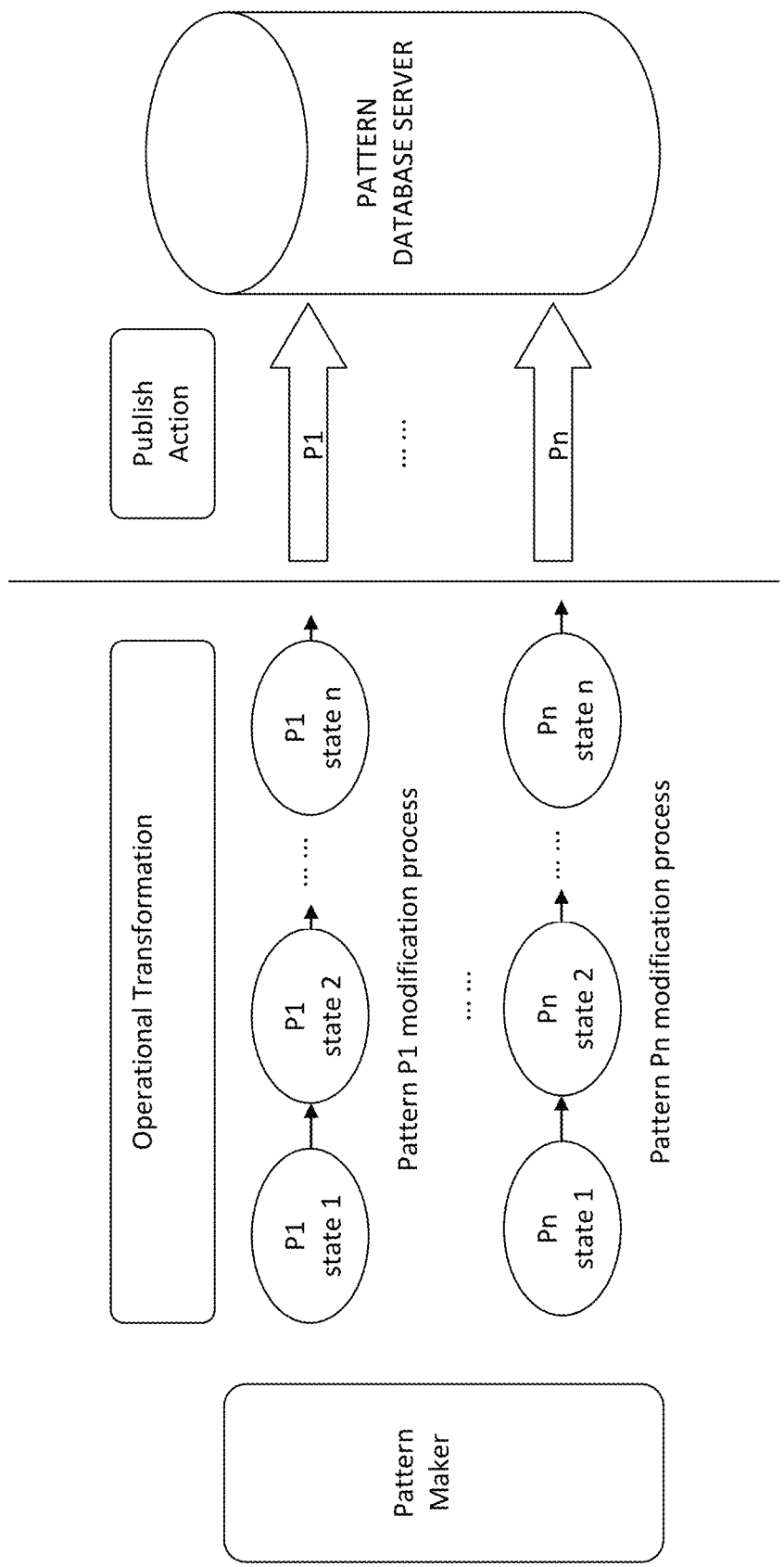
FIG. 10 illustrates representative apparatus and method embodiment diagram particularly work flow interactive pattern modification for cloud-based multiuser garment design according to one or more aspect of the present invention.

FIG. 10 illustrates representative apparatus and method embodiment diagram particularly work flow interactive pattern definition for cloud-based multiuser garment design according to one or more aspect of the present invention. Editing of patterns by pattern makers is achieved through the algorithm of "operational transformation". Its main idea is to store and instantly modify the state of the system directly in the web browser of the pattern maker. In this case, all actions on the data model are sent to the server, which resolves conflicts and dispatches the state modification operations to other users connected to it. Publication of data from the work to the public layer occurs on the trigger, activated by the pattern maker, which has the appropriate privileges. This software architecture allows the pattern maker to work on individual garment design elements and products, avoiding showing intermediate results of work to customers. At the end of the pattern production cycle, the results of pattern makers' work become available to the public.

FIGS. 11-15 illustrate representative user interface diagrams for rendering design according to one or more aspect of the present invention. For example, such display interface includes user selectable audio/visual icons, buttons, or other multi-media or graphical means for user interaction to communicate or otherwise select computer-implemented items according to automated activity.

Figure 11:
FIG. 11-15 illustrate representative user interface diagrams for cloud-based multiuser garment design according to one or more aspect of the present application.
Figure 12:
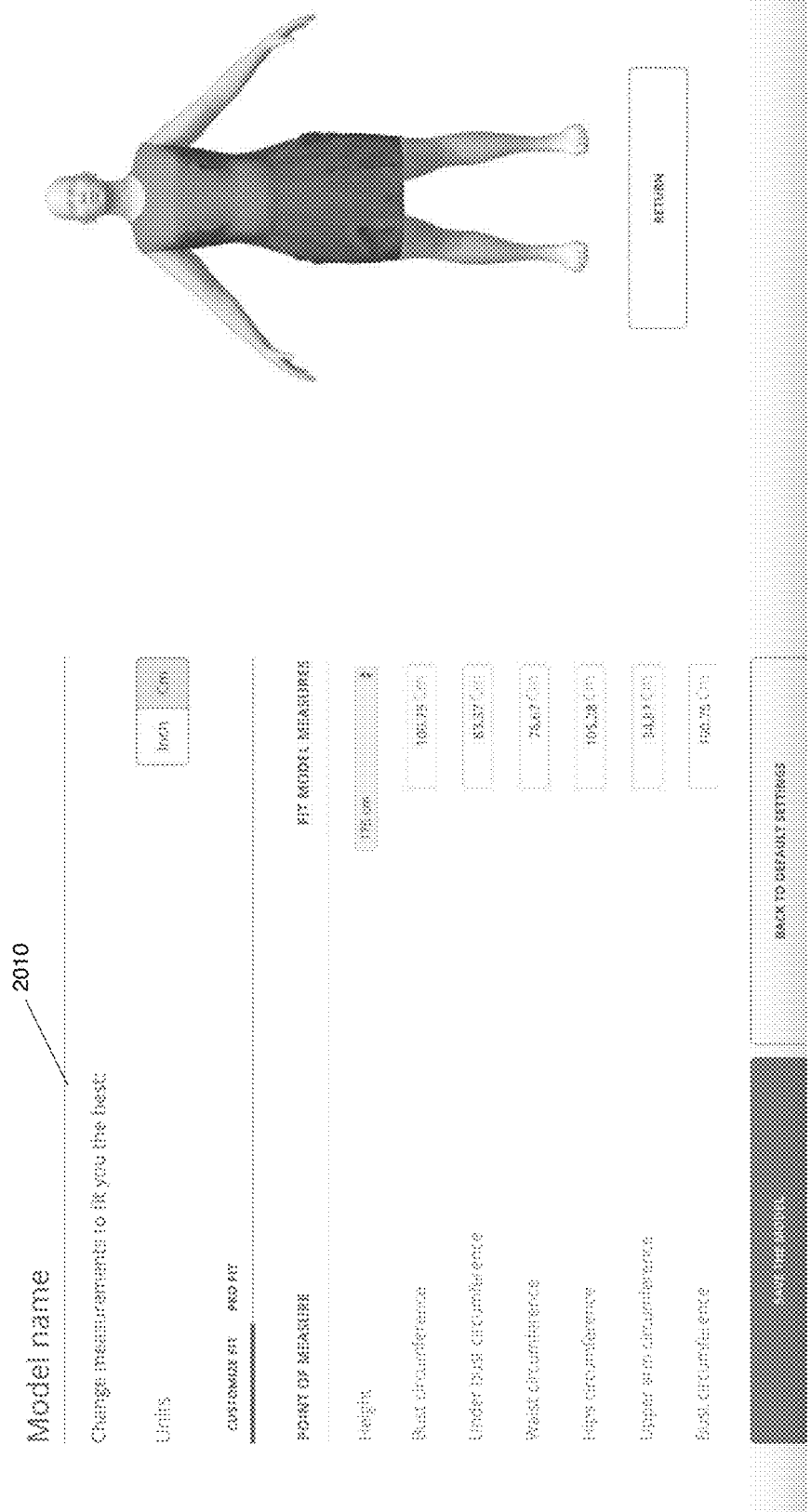
Figure 13:
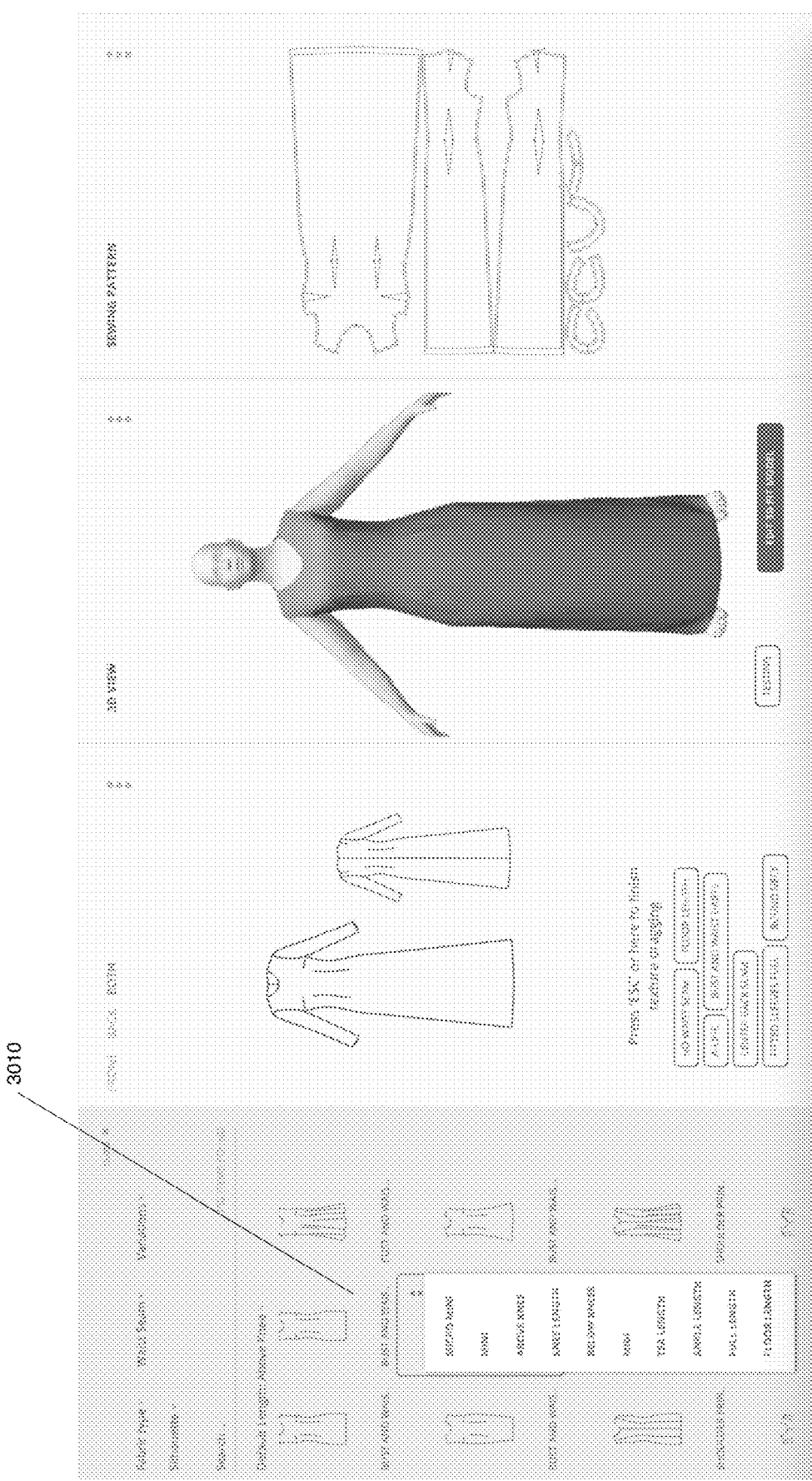
Figure 14:
Figure 15:
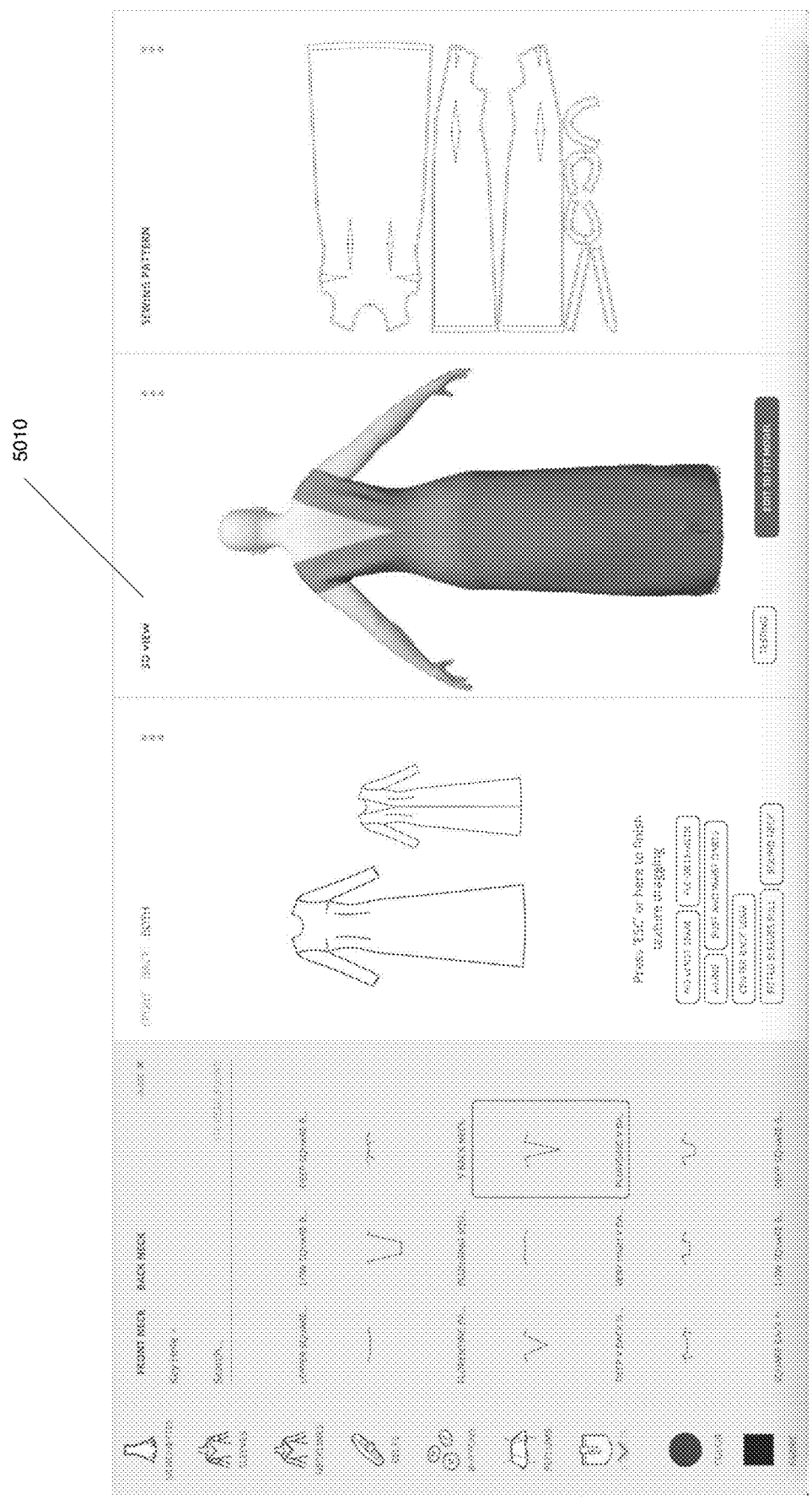

FIG. 11 shows representative interfaces 1010—Catalogue, 1011—Design Preview, 1012—3D View, 1013—Sewing pattern preview. FIG. 12 shows representative interface 2010 for setting measurements. FIG. 13 shows representative interface 3010 for setting pattern parameter (Length in this example). FIG. 14 shows representative interface 4010 for selection of pattern geometry (Front neck in this example). FIG. 15 shows representative interface 5010 for preview of changed pattern geometry (Back neck in this example).

Foregoing descriptions of specific embodiments of the invention have been presented for purposes of illustration and description. They are not intended to be exhaustive or to limit the invention to the precise forms disclosed. Modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

The invention claimed is:

1. A system for one-step apparel and accessories design, comprising:
   a computer platform having:
   a computer with a display, the display is configured to provide an interactive user interface with a user;
   a platform with software that allows for a multi-user multi-level access to exposed functionality of interactive three-dimensional (3D) fashion design and a product visualization and that is configured as a web service demonstration of a finished sewn product of a user's figure that is superimposed on an image of the user and displayed to the user, the platform software having:
   a catalog with a plurality of apparel designs for selection by the user, the catalog is displayed on the display associated with the computer;
   a kit associated with a plurality of patterns associated with the plurality of apparel designs; and
   a pattern with an element geometry of the user's figure, the pattern is an abstract elastic grid that utilizes a pattern vertex and a pattern edge to create an edge definition, which in turn matches the user's figure, the user figure includes one or more of:
   a height of the user;

bust circumference;
waist circumference; and
hip circumference;
a garment that is a representation of pattern geometry via relations between its elements, constraints and set of parameters created by the computer platform;
wherein a product is created with selection of the plurality of apparel design, selection of the plurality of patterns, and input of the element geometry and the product is superimposed on the user's figure;
wherein the product is displayed on the display via the computer platform;
wherein the interactive 3D fashion design is a configuration of a product from parametric library elements and their editing;
wherein said editing includes assigning or changing of pattern parameters, pattern positioning, relations and constraints;
wherein said multi-user multi-level access to exposed functionality of interactive 3D fashion design allows users concurrent work on work and public layers of the system;
wherein a design element is a parametric and anthropometric pattern algorithm stored in a library and accessible to designers to use it in their design;
wherein a public layer is a part of a system to create a final product, pattern kit, 3D simulation and personalized made-to-measure garment; and
wherein said commercialization is a method of providing commercial distribution of a final product, pattern or a user-created kit by means of the platform or via integration with a third ($3^{rd}$) party solution.

2. The system of claim 1 wherein said final product is a ready-to-production set of patterns for exact personal body measurements.

3. The system of claim 1 wherein said pattern kit is a set of parameterized patterns defining garment to be used for grading and creation of personalized made-to-measure garment.

4. The system of claim 1 wherein said 3D simulation is a realistic visualization of garment via graphic accelerator engine using physics simulation of materials, their behavior, real time simulation and rendering.

5. The system of claim 1 wherein said personalized made to-measure garment is represented as flat technical sketch of patterns, CAD or CAM file suitable for immediate production of the garment.

6. The system of claim 1 wherein said configuration of a product is a selection of garment elements from the library representing by parametric made-to-measure pattern algorithm; combining garment elements together; applying measured body parameters to patterns to fit preconfigured body mannequin.

7. The system of claim 1 wherein said means of the platform are tools of a system allows to extend its libraries with user-defined elements for further usage by other users.

8. The system of claim 1 wherein said means of the platform are tools providing payment for a creator of user-defined elements when such elements have been used in the final products by other users.

\* \* \* \* \*